United States Patent
Liu et al.

(10) Patent No.: US 9,807,702 B2
(45) Date of Patent: Oct. 31, 2017

(54) PRECODING METHOD AND APPARATUS FOR HETEROGENEOUS NETWORK COORDINATED MULTI-POINT TRANSMISSION

(71) Applicant: Huawei Technologies Co., Ltd., Shenzhen (CN)

(72) Inventors: Yalin Liu, Shenzhen (CN); Zhikun Xu, Shenzhen (CN); Yan Chen, Shenzhen (CN); Wei Zhang, Shenzhen (CN); Shunqing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 14/939,938

(22) Filed: Nov. 12, 2015

(65) Prior Publication Data

US 2016/0073411 A1    Mar. 10, 2016

Related U.S. Application Data

(63) Continuation of application No. PCT/CN2014/076423, filed on Apr. 29, 2014.

(30) Foreign Application Priority Data

May 13, 2013 (CN) .......................... 2013 1 0174930

(51) Int. Cl.
*H04W 52/24* (2009.01)
*H04B 7/024* (2017.01)
(Continued)

(52) U.S. Cl.
CPC .......... *H04W 52/244* (2013.01); *H04B 7/024* (2013.01); *H04L 1/06* (2013.01);
(Continued)

(58) Field of Classification Search
CPC ............ H04W 52/244; H04W 72/0473; H04B 7/024; H04B 7/216; H04J 11/005
See application file for complete search history.

(56) References Cited

U.S. PATENT DOCUMENTS

| 9,148,818 B2* | 9/2015 | Yue ......................... H04L 5/001 |
| 2008/0299981 A1 | 12/2008 | Foschini |

(Continued)

FOREIGN PATENT DOCUMENTS

| CN | 101841357 A | 9/2010 |
| CN | 102355714 A | 2/2012 |

(Continued)

OTHER PUBLICATIONS

Lee et al., "Coordinated Multipoint Transmission and Reception in LTE-Advanced: Deployment Scenarios and Operational Challenges," IEEE Communications Magazine, pp. 148-155, Institute of Electrical and Electronics Engineers, New York, New York (Feb. 2012).

(Continued)

*Primary Examiner* — Raj Jain
(74) *Attorney, Agent, or Firm* — Leydig, Voit & Mayer, Ltd.

(57) ABSTRACT

Embodiments of the present invention disclose a precoding method and an apparatus for heterogeneous network coordinated multi-point transmission. The method includes: obtaining parameter information of the heterogeneous network coordinated multi-point transmission system; comparing a first channel space transmitting power with the maximum transmitting power of a macro base station, and comparing a second channel space transmitting power with the maximum transmitting power of a micro base station according to the parameter information to obtain a comparison result; determining an obtaining manner of a precoding vector according to the comparison result, and obtaining a (Continued)

first precoding vector according to the obtaining manner of the precoding vector; and configuring the macro base station and the micro base station according to the first precoding vector. The embodiments of the present invention are applicable to a heterogeneous network coordinated multi-point transmission environment.

16 Claims, 4 Drawing Sheets

(51) Int. Cl.
  *H04W 52/42* (2009.01)
  *H04L 1/06* (2006.01)
  *H04W 24/02* (2009.01)
  *H04L 25/03* (2006.01)
  *H04L 5/00* (2006.01)
  *H04W 16/32* (2009.01)
  *H04W 72/04* (2009.01)
  *H04W 88/08* (2009.01)

(52) U.S. Cl.
  CPC ....... *H04L 25/03904* (2013.01); *H04W 24/02* (2013.01); *H04W 52/42* (2013.01); *H04L 5/0035* (2013.01); *H04W 16/32* (2013.01); *H04W 72/0473* (2013.01); *H04W 88/08* (2013.01)

(56) References Cited

U.S. PATENT DOCUMENTS

| | | | |
|---|---|---|---|
| 2009/0196245 A1* | 8/2009 | Ji | H04L 1/0025 370/329 |
| 2010/0279729 A1 | 11/2010 | Hui et al. | |
| 2011/0164668 A1* | 7/2011 | Hoek | H04B 7/0619 375/224 |
| 2012/0002743 A1 | 1/2012 | Cavalcante et al. | |
| 2012/0033604 A1 | 2/2012 | Hirakawa et al. | |
| 2014/0050182 A1* | 2/2014 | Iwai | H04W 52/325 370/329 |
| 2014/0140235 A1* | 5/2014 | Park | H04W 52/244 370/252 |
| 2014/0286283 A1* | 9/2014 | Kim | H04J 11/005 370/329 |
| 2016/0073411 A1* | 3/2016 | Liu | H04W 52/244 370/329 |

FOREIGN PATENT DOCUMENTS

CN 103037485 A 4/2013
WO WO 2010122876 A1 10/2010

OTHER PUBLICATIONS

Zhang, "Research on Distributed Precoding in IMT-Advanced" pp. 1-66 (Jul. 31, 2012).

* cited by examiner

PRECODING METHOD AND APPARATUS FOR HETEROGENEOUS NETWORK COORDINATED MULTI-POINT TRANSMISSION

CROSS-REFERENCE TO RELATED APPLICATIONS

This application is a continuation of International Application No. PCT/CN2014/076423, filed on Apr. 29, 2014, which claims priority to Chinese Patent Application No. 201310174930.4, filed on May 13, 2013, both of which are hereby incorporated by reference in their entireties.

FIELD OF THE INVENTION

The embodiments of the present invention relates to the technical field of communications, and particularly, to a precoding method and an apparatus for heterogeneous network coordinated multi-point transmission.

BACKGROUND OF THE INVENTION

With the development of communication technology, a heterogeneous network has been widely used. The heterogeneous network refers to a communication network in which two or more wireless communication systems adopt different access technologies, or adopt the same wireless access technology but belong to different wireless carriers. By means of a variety of existing wireless communication systems, a system integration manner is adopted to make multiple systems complement each other, this is an effective manner to meet the mobile communication service requirements in the future, and the respective advantages of the systems may be comprehensively displayed. Since a variety of existing wireless access systems overlap in a large number of areas, these mutually overlapping and different types of wireless access systems may be intelligently combined together, and a variety of networks provide ubiquitous wireless access for users by means of intelligent access means of multi-mode terminals. The above-mentioned heterogeneous network generally includes a macro base station and a micro base station. The macro base station provides a larger coverage range and may serve hundreds of users, while the micro base station mainly provides services for the users within the coverage area thereof. Due to the randomness of the activity time of the micro base station in the heterogeneous network, the interference becomes very complex, and since a lot of micro base stations exist in the heterogeneous network, the interference restricted area becomes more intensive, resulting in inter-cell interference in the heterogeneous network.

Coordinated multi-point (CoMP) transmission is an effective technology for inhibiting the inter-cell interference. The coordinated multi-point transmission means that a plurality of geographically separated transmission points cooperatively transmit data for one terminal or jointly receive data sent by one terminal, and the plurality of cooperative transmission points generally refer to base stations of different cells, for example, the above-mentioned macro base station and micro base station. If coordinated multi-point transmission is needed to perform, coordinated multi-point transmission precoding for downlink transmission is needed to be calculated, so as to configure the base stations by obtaining a precoding vector. The main factor considered in the current process of obtaining the precoding vector is how to achieve an optimal spectrum efficiency, in this way, the energy efficiency of the base stations configured by the obtained pre-encoding vector may be lower and the energy necessary for the base stations to transmit unit data is higher.

SUMMARY OF THE INVENTION

Embodiments of the present invention provide a precoding method and an apparatus for heterogeneous network coordinated multi-point transmission, which may be used for solving the problem that the main factor considered in the process of obtaining a pre-encoding vector in the prior art is how to achieve an optimal spectrum efficiency, resulting in lower energy efficiency of base stations configured by the obtained precoding vector and higher energy necessary for the base stations to transmit unit data.

To fulfill the above-mentioned objectives, the embodiments of the present invention adopt the following technical solutions:

In a first aspect, an embodiment of the present invention provides a precoding method for heterogeneous network coordinated multi-point transmission, applied to a heterogeneous network coordinated multi-point transmission system, the heterogeneous network coordinated multi-point transmission system includes a macro base station, a micro base station and one or more user terminals, and the method includes:

obtaining parameter information of the heterogeneous network coordinated multi-point transmission system;

comparing a first channel space transmitting power with the maximum transmitting power of the macro base station, and comparing a second channel space transmitting power with the maximum transmitting power of the micro base station according to the parameter information to obtain a comparison result;

determining an obtaining manner of a precoding vector according to the comparison result, and obtaining a first precoding vector according to the obtaining manner of the precoding vector; and configuring the macro base station and the micro base station according to the first precoding vector.

According to the first aspect, in the precoding method for heterogeneous network coordinated multi-point transmission in a first implementation manner of the first aspect, the parameter information includes a first channel coefficient of the macro base station and the user terminals, a second channel coefficient of the micro base station and the user terminals, a system bandwidth, noise power, user data rate requirements of the user terminals, the number of the user terminals, the number of transmitting antennas of the macro base station, the number of transmitting antennas of the micro base station, the maximum transmitting power of the macro base station, and the maximum transmitting power of the micro base station.

According to the first implementation manner, in the precoding method for heterogeneous network coordinated multi-point transmission in a second implementation manner of the first aspect, before the comparing a first channel space transmitting power with the maximum transmitting power of the macro base station, and comparing a second channel space transmitting power with the maximum transmitting power of the micro base station according to the parameter information to obtain a comparison result, the method includes:

obtaining the first channel space transmitting power and the second channel space transmitting power according to the parameter information.

According to the second implementation manner, in the precoding method for heterogeneous network coordinated multi-point transmission in a third implementation manner of the first aspect, before the comparing the first channel space transmitting power with the maximum transmitting power of the macro base station, and comparing the second channel space transmitting power with the maximum transmitting power of the micro base station according to the parameter information to obtain a comparison result, the method includes:

performing space decomposition on the heterogeneous network coordinated multi-point transmission system to decompose into a channel space and a channel zero space.

According to the third implementation manner, in the precoding method for heterogeneous network coordinated multi-point transmission in a fourth implementation manner of the first aspect, the obtaining the first channel space transmitting power and the second channel space transmitting power according to the parameter information includes:

obtaining transmitting power of various precoding vectors in the channel space according to the user data rate requirements of the user terminals; and obtaining the first channel space transmitting power and the second channel space transmitting power according to the transmitting power of the various precoding vectors.

According to the fourth implementation manner, in the precoding method for heterogeneous network coordinated multi-point transmission in a fifth implementation manner of the first aspect, the determining an obtaining manner of a precoding vector according to the comparison result, and obtaining the precoding vector according to the obtaining manner of the precoding vector, includes:

when the comparison result is that the first channel space transmitting power is smaller than or equal to the maximum transmitting power of the macro base station, and the second channel space transmitting power is smaller than or equal to the maximum transmitting power of the micro base station, determining the coordinated multi-point transmission as channel space transmission;

taking the first channel space transmitting power as transmitting power of the macro base station, and taking the second channel space transmitting power as transmitting power of the micro base station; and obtaining the first precoding vector.

According to the fourth implementation manner, in the precoding method for heterogeneous network coordinated multi-point transmission in a sixth implementation manner of the first aspect, the determining an obtaining manner of a precoding vector according to the comparison result, and obtaining the precoding vector according to the obtaining manner of the precoding vector, includes:

when the comparison result is that the first channel space transmitting power is larger than the maximum transmitting power of the macro base station, or the second channel space transmitting power is larger than the maximum transmitting power of the micro base station, determining the coordinated multi-point transmission as joint transmission of the channel space and the channel zero space;

obtaining a precoding vector of the channel space and a precoding vector of the channel zero space; and obtaining the first precoding vector according to the precoding vector of the channel space and the precoding vector of the channel zero space.

According to the third implementation manner, in the precoding method for heterogeneous network coordinated multi-point transmission in a seventh implementation manner of the first aspect, after the obtaining the first precoding vector according to the precoding vector of the channel space and the precoding vector of the channel zero space, the method further includes:

obtaining transmitting power of the macro base station and transmitting power of the micro base station according to the first precoding vector.

In a second aspect, an embodiment of the present invention provides a precoding apparatus for heterogeneous network coordinated multi-point transmission, applied to a heterogeneous network coordinated multi-point transmission system, the heterogeneous network coordinated multi-point transmission system includes a macro base station, a micro base station and one or more user terminals, and the apparatus includes:

an obtaining unit, configured to obtain parameter information of the heterogeneous network coordinated multi-point transmission system;

a comparing unit, configured to compare a first channel space transmitting power with the maximum transmitting power of the macro base station, and compare a second channel space transmitting power with the maximum transmitting power of the micro base station according to the parameter information obtained by the obtaining unit to obtain a comparison result;

the obtaining unit is further configured to determine an obtaining manner of a precoding vector according to the comparison result obtained by the comparing unit, and obtain a first precoding vector according to the obtaining manner of the precoding vector; and a configuring unit, configured to configure the macro base station and the micro base station according to the first precoding vector obtained by the obtaining unit.

According to the second aspect, in the precoding apparatus for heterogeneous network coordinated multi-point transmission in a first implementation manner of the second aspect, the parameter information includes a first channel coefficient of the macro base station and the user terminals, a second channel coefficient of the micro base station and the user terminals, a system bandwidth, noise power, user data rate requirements of the user terminals, the number of the user terminals, the number of transmitting antennas of the macro base station, the number of transmitting antennas of the micro base station, the maximum transmitting power of the macro base station, and the maximum transmitting power of the micro base station.

According to the first implementation manner, in the precoding apparatus for heterogeneous network coordinated multi-point transmission in a second implementation manner of the second aspect, the obtaining unit is further configured to:

obtain the first channel space transmitting power and the second channel space transmitting power according to the parameter information obtained by the obtaining unit.

According to the second implementation manner, in the precoding apparatus for heterogeneous network coordinated multi-point transmission in a third implementation manner of the second aspect, the apparatus further includes:

a decomposition unit, configured to perform space decomposition on the heterogeneous network coordinated multi-point transmission system to decompose into a channel space and a channel zero space.

According to the third implementation manner, in the precoding apparatus for heterogeneous network coordinated multi-point transmission in a fourth implementation manner of the second aspect, the obtaining unit is specifically configured to:

obtain transmitting power of various precoding vectors in the channel space according to the user data rate requirements of the user terminals; and obtain the first channel space transmitting power and the second channel space transmitting power according to the transmitting power of the various precoding vectors.

According to the fourth implementation manner, in the precoding apparatus for heterogeneous network coordinated multi-point transmission in a fifth implementation manner of the second aspect, the obtaining unit includes:

a determining module, configured to, when the comparison result is that the first channel space transmitting power is smaller than or equal to the maximum transmitting power of the macro base station, and the second channel space transmitting power is smaller than or equal to the maximum transmitting power of the micro base station, determine the coordinated multi-point transmission as channel space transmission;

the determining module is further configured to take the first channel space transmitting power as transmitting power of the macro base station and take the second channel space transmitting power as transmitting power of the micro base station; and an obtaining module, configured to obtain the first precoding vector.

According to the fourth implementation manner, in the precoding apparatus for heterogeneous network coordinated multi-point transmission in a sixth implementation manner of the second aspect, the obtaining unit includes:

a determining module, configured to, when the comparison result is that the first channel space transmitting power is larger than the maximum transmitting power of the macro base station, or the second channel space transmitting power is larger than the maximum transmitting power of the micro base station, determine the coordinated multi-point transmission as joint transmission of the channel space and the channel zero space; and an obtaining module, configured to obtain a precoding vector of the channel space and a precoding vector of the channel zero space;

the obtaining module is further configured to obtain the first precoding vector according to the precoding vector of the channel space and the precoding vector of the channel zero space.

According to the third implementation manner, in the precoding apparatus for heterogeneous network coordinated multi-point transmission in a seventh implementation manner of the second aspect, the obtaining unit is further configured to:

obtain transmitting power of the macro base station and transmitting power of the micro base station according to the first precoding vector.

The precoding method and apparatus for heterogeneous network coordinated multi-point transmission provided by the embodiments of the present invention obtain parameter information of the heterogeneous network coordinated multi-point transmission system; compare a first channel space transmitting power with the maximum transmitting power of a macro base station, and compare a second channel space transmitting power with the maximum transmitting power of a micro base station according to the parameter information to obtain a comparison result; determine an obtaining manner of a precoding vector according to the comparison result, and obtain a first precoding vector according to the obtaining manner of the precoding vector; and configure the macro base station and the micro base station according to the first precoding vector. The main factor considered in the process of obtaining the precoding vector in the prior art is how to achieve an optimal spectrum efficiency. The precoding manner of the heterogeneous network coordinated multi-point transmission in embodiments of the present invention relates to the maximum transmitting power of the macro base station and the micro base station, such that the energy efficiency of the base stations configured by the obtained precoding vector is higher and the energy necessary for the base stations to transmit unit data is lower, and the purposes of high efficiency and energy saving is achieved.

BRIEF DESCRIPTION OF THE DRAWINGS

To illustrate the technical solutions in the embodiments of the present invention or in the prior art more clearly, a brief introduction on the accompanying drawings which are needed in the description of the embodiments or the prior art is given below. The accompanying drawings in the description below are merely some of the embodiments of the present invention, based on which other drawings may be obtained by those of ordinary skill in the art without any creative effort.

DETAILED DESCRIPTION OF THE EMBODIMENTS

A clear and complete description of technical solutions in the embodiments of the present invention will be given below, in combination with the accompanying drawings in the embodiments of the present invention. The embodiments described below are merely a part, but not all, of the embodiments of the present invention. All of the other embodiments, obtained by those of ordinary skill in the art based on the embodiments of the present invention without any creative effort, fall into the protection scope of the present invention.

In order to make the advantages of the technical solutions of the present invention clearer, a further detailed description of the present invention will be given below in combination with accompanying drawings and embodiments.

Figure 1:
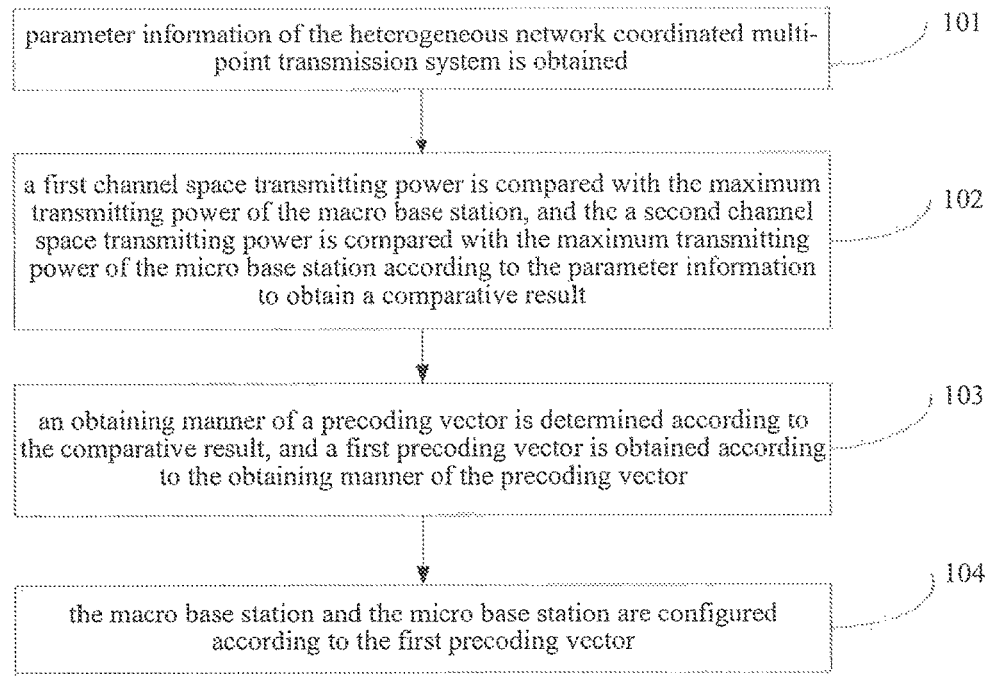
FIG. 1 is a flowchart of a precoding method for heterogeneous network coordinated multi-point transmission provided by an embodiment of the present invention.

As shown in FIG. 1, a precoding method for heterogeneous network coordinated multi-point transmission provided by an embodiment of the present invention, applied to a heterogeneous network coordinated multi-point transmission system, wherein the heterogeneous network coordinated multi-point transmission system includes a macro base station, a micro base station and one or more user terminals, and the method includes:

101. parameter information of the heterogeneous network coordinated multi-point transmission system is obtained.

Figure 2:
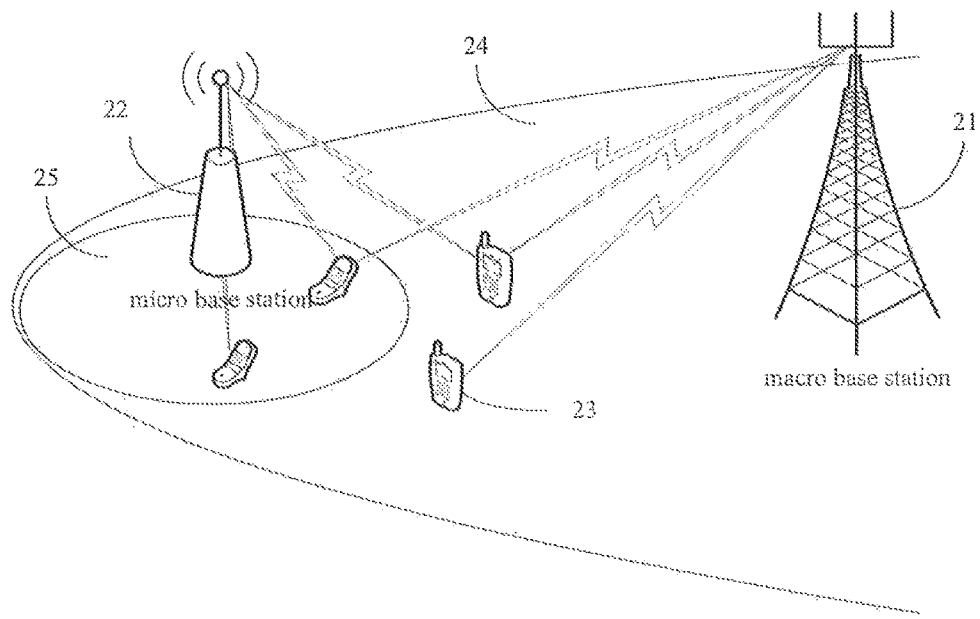
FIG. 2 is a schematic diagram of a heterogeneous network coordinated multi-point transmission system provided by an embodiment of the present invention.

Specifically, in the embodiment of the present invention, as shown in FIG. 2, the precoding method is mainly applied to a heterogeneous network coordinated multi-point transmission system, the system includes a macro base station 21, a micro base station 22 and one or more user terminals 23, wherein the macro base station 21 forms a macro cell 24 with a part of user terminals 23, and the micro base station 22 forms a micro cell 25 with a part of user terminals 23. Since a plurality of micro cells in a heterogeneous network have no overlapping coverage area in general, the embodiment of the present invention will be described with coordinated transmission of a macro base station 21 and a micro base station 22 as a scenario. The macro base station 21 and the micro base station 22 are respectively configured with $N_M$ and $N_P$ transmitting antennas, and $N_M > N_P$, and the macro base station 21 and the micro base station 22 co-serve user terminals of the macro base station and user terminals of the micro base station in a coordination manner. The user terminals of the macro base station and the user terminals of the micro base station are all configured with single antennas, and the total number of the user terminals of the macro base station and the user terminals of the micro base station is K. It is assumed that the macro base station 21 and the micro base station 22 may exchange data and channel information without error in zero time delay through a backbone network.

The parameter information includes a first channel coefficient $\{h_i^M\}_{i=1}^K$ of the macro base station and the user terminals, a second channel coefficient $\{h_i^P\}_{i=1}^K$ of the micro base station and the user terminals, a system bandwidth B, noise power $\sigma^2$, user data rate requirements $\{R_i\}_{i=1}^K$ of the user terminals, the number K of the user terminals, the number $N_M$ of transmitting antennas of the macro base station, the number $N_P$ of the transmitting antennas of the micro base station, the maximum transmitting power $P_M$ of the macro base station, and the maximum transmitting power $P_P$ of the micro base station.

102. a first channel space transmitting power is compared with the maximum transmitting power of the macro base station, and a second channel space transmitting power is compared with the maximum transmitting power of the micro base station according to the parameter information to obtain a comparison result.

When the first precoding vector of the user terminal i is $w_i$, wherein $w_i$ is an unknown number, the achievable data rate of the user terminal i is expressed by the following formula:

$$C_i = B\log_2\left(1 + \frac{h_i^H w_i w_i^H h_i}{\sigma^2}\right)$$

wherein, the dimension of the precoding vector $w_i$ is $N_M + N_P$, B represents system bandwidth, $\sigma^2$ represents noise power, $h_i$ is equivalent to $$\begin{pmatrix} h_i^M \\ h_i^P \end{pmatrix}$$

and represents the global channel information of the user terminal i, and the dimension thereof is $N_M + N_P$.

The constraints of the transmitting power of the macro base station and the micro base station are respectively expressed by formula 1 as:

$$\sum_{i=1}^K w_i^H Q_1^H Q_1 w_i \leq P_M$$

and $$\sum_{i=1}^K w_i^H Q_2^H Q_2 w_i \leq P_P,$$

wherein, $Q_1 = (I_{N_M}, 0_{N_M \times N_P})$, $Q_2 = (0_{N_P \times N_M}, I_{N_P})$, $I_{N_M}$ represent a unit matrix with a size of $N_M \times N_M$, $0_{N_M \times N_P}$ represents an all-zero matrix with a size of $N_M \times N_P$, $I_{N_P}$ represents a unit matrix with a size of $N_P \times N_P$, and $0_{N_P \times N_M}$ represents an all-zero matrix with a size of $N_P \times N_M$.

103. an obtaining manner of a precoding vector is determined according to the comparison result, and a first precoding vector is obtained according to the obtaining manner of the precoding vector.

Specifically, space decomposition is performed on the heterogeneous network coordinated multi-point transmission system to decompose the same into a channel space and a channel zero space. When the first channel space transmitting power is smaller than or equal to the maximum transmitting power of the macro base station, and the second channel space transmitting power is smaller than or equal to the maximum transmitting power of the micro base station, the coordinated multi-point transmission is determined as channel space transmission. Otherwise, the coordinated multi-point transmission is determined as joint transmission of the channel space and the channel zero space. Due to different transmission manners, the obtaining manners of the precoding vector are different, which will be explained specifically in the specific example of FIG. 3A and FIG. 3B and will not be repeated redundantly herein.

104. the macro base station and the micro base station are configured according to the first precoding vector.

The precoding method for heterogeneous network coordinated multi-point transmission provided by the embodiment of the present invention obtains the parameter information of the heterogeneous network coordinated multi-point transmission system; compares the first channel space transmitting power with the maximum transmitting power of the macro base station, and compares the second channel space transmitting power with the maximum transmitting power of the micro base station according to the parameter information to obtain the comparison result; determines the obtaining manner of the precoding vector according to the comparison result, and obtains the first precoding vector according to the obtaining manner of the precoding vector; and configures the macro base station and the micro base station according to the first precoding vector. The main factor considered in the process of obtaining the pre-encoding vector in the prior art is how to achieve an optimal spectrum efficiency. The precoding manner of the heterogeneous network coordinated multi-point transmission in the embodiments of the present invention relates to the maximum transmitting power of the macro base station and the micro base station, such that the energy efficiency of the base stations configured by the obtained precoding vector is higher and the energy necessary for the base stations to transmit unit data is lower, in order to achieve the purposes of high efficiency and energy saving.

Figure 3A:
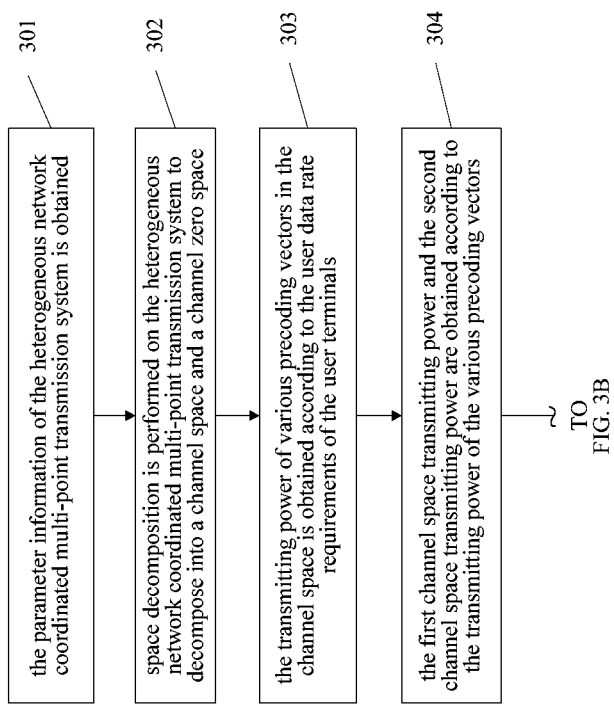
FIG. 3A and FIG. 3B are a flowchart of a precoding method for heterogeneous network coordinated multi-point transmission provided by another embodiment of the present invention.
Figure 3B:
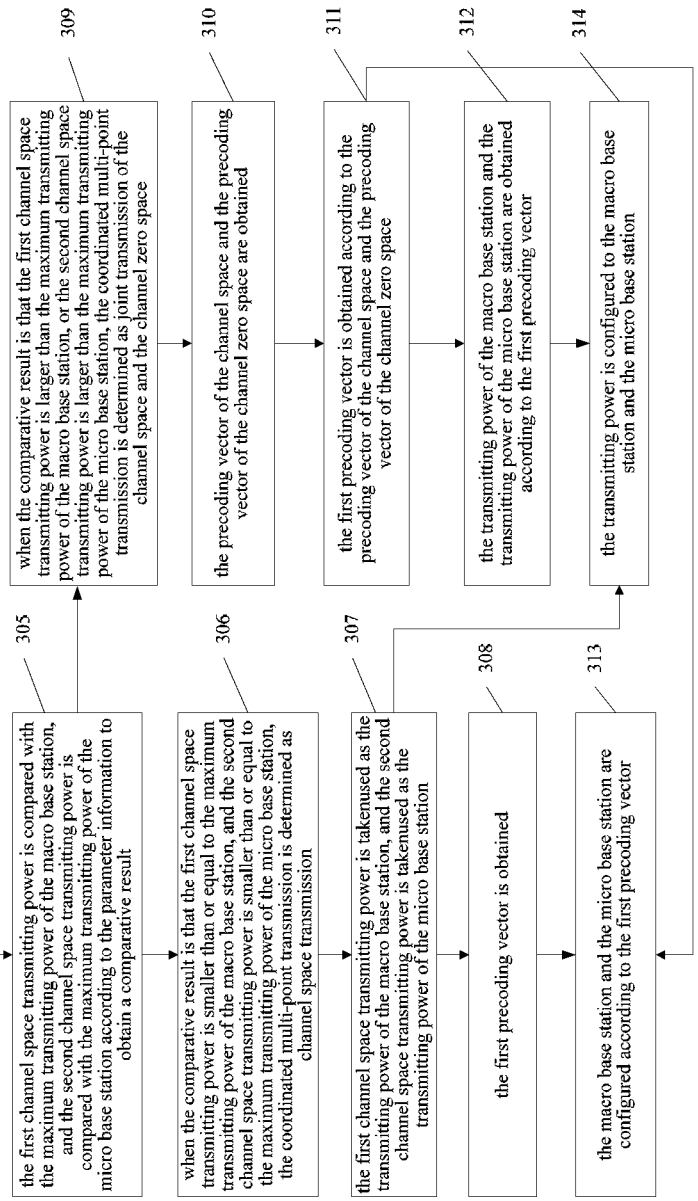

As shown in FIG. 3A and FIG. 3B, it is a precoding method for heterogeneous network coordinated multi-point transmission provided by another embodiment of the present invention, applied to a heterogeneous network coordinated multi-point transmission system, the heterogeneous network coordinated multi-point transmission system includes a macro base station, a micro base station and one or more user terminals, and the method includes:

301. the parameter information of the heterogeneous network coordinated multi-point transmission system is obtained.

The parameter information includes a first channel coefficient $\{h_i^M\}_{i=1}^K$ of the macro base station and the user terminals, a second channel coefficient $\{h_i^P\}_{i=1}^K$ of the micro base station and the user terminals, a system bandwidth B, noise power $\sigma^2$, user data rate requirements $\{R_i\}_{i=1}^K$ of the user terminals, the number K of the user terminals, the number $N_M$ of transmitting antennas of the macro base station, the number $N_P$ of the transmitting antennas of the micro base station, the maximum transmitting power $P_M$ of the macro base station, and the maximum transmitting power $P_P$ of the micro base station.

302. space decomposition is performed on the heterogeneous network coordinated multi-point transmission system to decompose into a channel space and a channel zero space.

When the first precoding vector of the user terminal i is $w_i$, wherein $w_i$ is an unknown number, the achievable data rate of the user terminal i is expressed by the following formula 2:

$$C_i = B\log_2\left(1 + \frac{h_i^H w_i w_i^H h_i}{\sigma^2}\right)$$

wherein, the dimension of the precoding vector $w_i$ is $N_M + N_P$, B represents system bandwidth, $\sigma^2$ represents noise power, $h_i$ is equivalent to $$\begin{pmatrix} h_i^M \\ h_i^P \end{pmatrix}$$

and represents the global channel information of the user terminal i, and the dimension thereof is $N_M + N_P$.

For example, a channel matrix is set as $H = (h_1, h_2, \ldots h_K)$, then a channel pseudo-inverse matrix may be expressed as $H(H^H H)^{-1}$. It is set that $g_i$ is the ith column of the channel pseudo-inverse matrix, then it can be seen from matrix properties that, $\{g_i\}_{i=1}^K$ forms a group of bases of a space formed by channel vectors $h_1, h_2, \ldots h_K$. The space is called the channel space, and an orthogonal complementary space of the space is called the channel zero space. According to the linear space decomposition principle, a complex space may be decomposed into the channel space and the channel zero space.

303. the transmitting power of various precoding vectors in the channel space is obtained according to the user data rate requirements of the user terminals.

The dimension of the channel zero space is $N_M + N_P - K$, for example, $\{u_j\}_{j=1}^{N_M+N_P-K}$ is set as a group of orthogonal bases of the channel zero space, and then the first precoding vector $w_i$ may be expressed as:

$$w_i = \sum_{j=1}^K \xi_{ij} g_j + \sum_{j=1}^{N_M+N_P-K} b_{ij} u_j$$

wherein, $\xi_{ij}$ and $b_{ij}$ respectively represent coefficients on the bases of the channel space and the channel zero space.

According to the vector orthogonality and zero forcing criteria, when $i \neq j$, $\xi_{ij} = 0$. Therefore the first precoding vector $w_i$ may be further expressed as:

$$w_i = \xi_{ii} g_i + \sum_{j=1}^{N_M+N_P-K} b_{ij} u_j = \xi_{ii} g_i + U b_i,$$

wherein, $b_i$ represents the column vector of $N_M + N_P - K$ dimension, and the jth element thereof is $b_{ij}$.

The $$w_i = \xi_{ii} g_i + \sum_{j=1}^{N_M+N_P-K} b_{ij} u_j = \xi_{ii} g_i + U b_i$$

is substituted into the formula 1 and formula 2 to obtain an optimization problem of $\xi_{ij}$ and $b_i$, which is expressed by formula 3:

$$\min_{\{\xi_{ii}\}_{i=1}^K, \{b_i\}_{i=1}^K} \sum_{i=1}^K \{\xi_{ii}^2 |g_i|^2 + b_i^H b_i\}$$

s.t.

$$B\log_2\left(1 + \frac{\xi_{ii}^2}{\sigma^2}\right) = R_i,$$

$$i = 1, \ldots, K$$

$$\sum_{i=1}^K (\xi_{ii} g_i + U b_i)^H Q_1^H Q_1 (\xi_{ii} g_i + U b_i) \leq P_M$$

$$\sum_{i=1}^K (\xi_{ii} g_i + U b_i)^H Q_2^H Q_2 (\xi_{ii} g_i + U b_i) \leq P_P$$

$\xi_{ii}^2 = \sigma^2(2^{R_i/B} - 1)$ may be obtained from $$B\log_2\left(1 + \frac{\xi_{ii}^2}{\sigma^2}\right) = R_i, \quad i = 1, \cdots, K.$$

If $\xi_{ii} \geq 0$, then $\xi_{ii} = \sqrt{\sigma^2(2^{R_i/B} - 1)}$. Wherein, $\xi_{ii}^2$ represents the transmitting power of various precoding vectors in the channel space.

304. the first channel space transmitting power and the second channel space transmitting power are obtained according to the transmitting power of the various precoding vectors.

Specifically, the value of $\xi_{ii}$ is substituted into formula 3 to obtain an optimization problem of $\{b_i\}_{i=1}^K$, which is expressed by formula 4:

$$\min_{\{b_i\}_{i=1}^K} \sum_{i=1}^K b_i^H b_i$$

$$\text{s.t.} \sum_{i=1}^K (b_i^H U^H Q_1^H Q_1 U b_i + b_i^H a_i + a_i^H b_i + |\xi_{ii}|^2 g_i^H Q_1^H Q_1 g_i) \le P_M$$

$$\sum_{i=1}^K (b_i^H U^H Q_2^H Q_2 U b_i - b_i^H a_i - a_i^H b_i + |\xi_{ii}|^2 g_i^H Q_2^H Q_2 g_i) \le P_P$$

wherein, $a_i$ is equivalent to $\xi_{ii} U^H Q_1^H Q_1 g_i$.

the first channel space transmitting power may be obtained, and the formula is expressed as:

$$\sum_{i=1}^K (|\xi_{ii}|^2 g_i^H Q_1^H Q_1 g_i)$$

the second channel space transmitting power may be obtained, and the formula is expressed as:

$$\sum_{i=1}^K (|\xi_{ii}|^2 g_i^H Q_2^H Q_2 g_i)$$

305. the first channel space transmitting power is compared with the maximum transmitting power of the macro base station, and the second channel space transmitting power is compared with the maximum transmitting power of the micro base station according to the parameter information to obtain a comparison result. Step 306 or step 309 is executed thereafter.

306. when the comparison result is that the first channel space transmitting power is smaller than or equal to the maximum transmitting power of the macro base station, and the second channel space transmitting power is smaller than or equal to the maximum transmitting power of the micro base station, the coordinated multi-point transmission is determined as channel space transmission.

Specifically, when $$\sum_{i=1}^K (|\xi_{ii}|^2 g_i^H Q_1^H Q_1 g_i) \le P_M \text{ and } \sum_{i=1}^K (|\xi_{ii}|^2 g_i^H Q_2^H Q_2 g_i) \le P_P,$$

namely when the maximum transmitting power of the macro base station may satisfy the requirements of the first channel space transmitting power and the maximum transmitting power of the micro base station may satisfy the requirements of the second channel space transmitting power, the coordinated multi-point transmission is determined as the channel space transmission, and the channel zero space plays no function, thus it is determined that $b_i = 0$.

307. the first channel space transmitting power is taken as the transmitting power of the macro base station, and the second channel space transmitting power is taken as the transmitting power of the micro base station. Step 308 and step 314 are executed thereafter.

Wherein, the first space transmitting power is $$\sum_{i=1}^K (|\xi_{ii}|^2 g_i^H Q_1^H Q_1 g_i),$$

and the second space transmitting power is $$\sum_{i=1}^K (|\xi_{ii}|^2 g_i^H Q_2^H Q_2 g_i).$$

308. the first precoding vector is obtained. Step 313 is executed thereafter.

Since $b_i = 0$, then in formula $$w_i = \xi_{ii} g_i + \sum_{j=1}^{N_M + N_P - K} b_{ij} u_j = \xi_{ii} g_i + Ub, \quad w_i = \xi_{ii} g_i,$$

and since $\xi_{ii} = \sqrt{\sigma^2(2^{R_i/B} - 1)}$, then the first precoding vector $w_i$ may be directly obtained.

309. when the comparison result is that the first channel space transmitting power is larger than the maximum transmitting power of the macro base station, or the second channel space transmitting power is larger than the maximum transmitting power of the micro base station, the coordinated multi-point transmission is determined as joint transmission of the channel space and the channel zero space.

At this time, the characteristic direction of the channel zero space vector needs to be selected:

for example, characteristic value decomposition is performed, which is as shown in the formula $U^H Q_1^H Q_1 U = V^H \Lambda V$, and variable substitution $b_i = V^H \tilde{b}_i$ is performed, the variable is substituted into formula 4 to obtain an optimization problem of $\tilde{b}_i$, which is as shown in formula 5:

$$\min_{\{b_i\}_{i=1}^K} \sum_{i=1}^K \tilde{b}_i^H \tilde{b}_i$$

$$\text{s.t.} \sum_{i=1}^K (\tilde{b}_i^H \Lambda \tilde{b}_i + \tilde{b}_i^H V a_i + a_i^H V^H \tilde{b}_i + |\xi_{ii}|^2 g_i^H Q_1^H Q_1 g_i) \le P_M$$

$$\sum_{i=1}^K (\tilde{b}_i^H (I_{N_M + N_P - K} - \Lambda) \tilde{b}_i - \tilde{b}_i^H V a_i - a_i^H V^H \tilde{b}_i +$$

$$|\xi_{ii}|^2 g_i^H Q_2^H Q_2 g_i) \le P_P$$

wherein, the positions of non-zero elements of $\tilde{b}_i$ correspond to the positions of diagonal elements located in a (0, 1) section in $\Lambda$. The number of the non-zero elements of $\tilde{b}_i$ is the number of the diagonal elements located in the (0, 1) section in $\Lambda$. The channel zero space vector $\tilde{U} = UV^H$ is updated, and a column vector corresponding to the positions of the diagonal elements located in the (0, 1) section in $\Lambda$ is extracted from $\tilde{U}$ to serve as the characteristic direction. The number thereof is $\min\{K, N_P, N_M + N_P - K\}$. The position corresponding to the zero element $\tilde{b}_i$ in formula 5 is simplified to obtain formula 6 as follows:

$$\min_{\{c_i\}_{i=1}^K} \sum_{i=1}^K c_i^H c_i$$

$$\text{s.t.} \quad \sum_{i=1}^K (c_i^H \tilde{\Lambda} c_i + c_i^H d_i + d_i^H c_i + |\xi_{ii}|^2 g_i^H Q_1^H Q_1 g_i) \le P_M$$

$$\sum_{i=1}^K (c_i^H (I - \Lambda) c_i - c_i^H d_i - d_i^H c_i + |\xi_{ii}|^2 g_i^H Q_2^H Q_2 g_i) \le P_P$$

wherein, $\tilde{\Lambda}$ represents a diagonal matrix formed by the diagonal elements between (0, 1) in $\Lambda$, $d_i$ represents the column vector formed by corresponding positions of $\xi_{ii} \tilde{U}^H V Q_1^H Q_1 g_i$, and $c_i$ represents power factors to be optimized on various characteristic directions.

Power distribution may be performed on the selected characteristic direction, and the power distribution algorithm may be an iterative search optimal method and an analytical solution suboptimal algorithm.

For example, numerical solution is performed via a convex optimization method (e.g., an interior point algorithm).

Or, the suboptimal algorithm is further utilized. For example, the user terminals in the system have the same weight on the characteristic direction, namely $c_i$ may be expressed as $c_i = rt_i$, wherein r represents the power normalizing weighted direction, $t_i^2$ represents the power consumption of the user i, and $t_i$ of the analytical solution may be obtained by an optimization method. Different weighted directions r may be selected according to demands, for example r=1, namely all the directions have the same weight.

310. the precoding vector of the channel space and the precoding vector of the channel zero space are obtained.

Wherein, the precoding vector of the channel space is $\xi_{ii} g_i$ and the precoding vector of the channel zero space is $Ub_i$.

311. the first precoding vector is obtained according to the precoding vector of the channel space and the precoding vector of the channel zero space. Step 312 and step 313 are executed thereafter.

Specifically, the first precoding vector may be the sum of the precoding vector of the channel space and the precoding vector of the channel zero space and is expressed as:

$$w_i = \xi_{ii} g_i + \sum_{j=1}^{N_M + N_P - K} b_{ij} u_j = \xi_{ii} g_i + Ub_i.$$

312. the transmitting power of the macro base station and the transmitting power of the micro base station are obtained according to the first precoding vector. Step 314 is executed thereafter.

Specifically, after the first precoding vector is obtained, since the transmitting power of the macro base station is $$\sum_{i=1}^K w_i^H Q_1^H Q_1 w_i,$$

and the transmitting power of the micro base station is $$\sum_{i=1}^K w_i^H Q_1^H Q_1 w_i,$$

is substituted into $$\sum_{i=1}^K w_i^H Q_1^H Q_1 w_i$$

and $$\sum_{i=1}^K w_i^H Q_1^H Q_1 w_i$$

to obtain the transmitting power of the macro base station and the transmitting power of the micro base station according to the first precoding vector.

313. the macro base station and the micro base station are configured according to the first precoding vector.

314. the transmitting power is configured to the macro base station and the micro base station.

The precoding method for heterogeneous network coordinated multi-point transmission provided by another embodiment of the present invention obtains parameter information of the heterogeneous network coordinated multi-point transmission system; compares a first channel space transmitting power with the maximum transmitting power of a macro base station, and compares a second channel space transmitting power with the maximum transmitting power of a micro base station according to the parameter information to obtain a comparison result; determines an obtaining manner of a precoding vector according to the comparison result, and obtains a first precoding vector according to the obtaining manner of the precoding vector; and configures the macro base station and the micro base station according to the first precoding vector. The main factor considered in the process of obtaining the pre-encoding vector in the prior art is how to achieve an optimal spectrum efficiency. The precoding manner of the heterogeneous network coordinated multi-point transmission in the embodiments of the present invention relates to the maximum transmitting power of the macro base station and the micro base station, such that the energy efficiency of the base stations configured by the obtained precoding vector is higher and the energy necessary for the base stations to transmit unit data is lower, and the purposes of high efficiency and energy saving is achieved.

Figure 4:
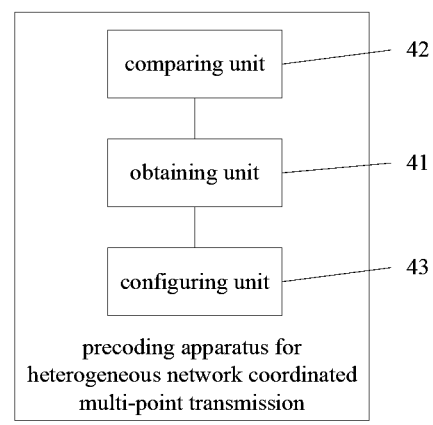
FIG. 4 is a first schematic diagram of a structure of a precoding apparatus for heterogeneous network coordinated multi-point transmission provided by an embodiment of the present invention.

As shown in FIG. 4, it is a precoding apparatus for heterogeneous network coordinated multi-point transmission provided by an embodiment of the present invention, applied to a heterogeneous network coordinated multi-point transmission system, the heterogeneous network coordinated multi-point transmission system includes a macro base station, a micro base station and one or more user terminals, and the apparatus includes:

an obtaining unit 41, configured to obtain parameter information of the heterogeneous network coordinated multi-point transmission system;

a comparing unit 42, configured to compare the first channel space transmitting power with the maximum transmitting power of the macro base station, and compare the second channel space transmitting power with the maximum transmitting power of the micro base station according to the parameter information obtained by the obtaining unit 41 to obtain a comparison result;

the obtaining unit 41 is further configured to determine an obtaining manner of a precoding vector according to the comparison result obtained by the comparing unit 42, and obtain a first precoding vector according to the obtaining manner of the precoding vector;

a configuring unit 43, configured to configure the macro base station and the micro base station according to the first precoding vector obtained by the obtaining unit 41.

Specifically, the parameter information includes a first channel coefficient of the macro base station and the user terminals, a second channel coefficient of the micro base station and the user terminals, a system bandwidth, noise power, user data rate requirements of the user terminals, the number of the user terminals, the number of transmitting antennas of the macro base station, the number of transmitting antennas of the micro base station, the maximum transmitting power of the macro base station, and the maximum transmitting power of the micro base station.

Figure 5:
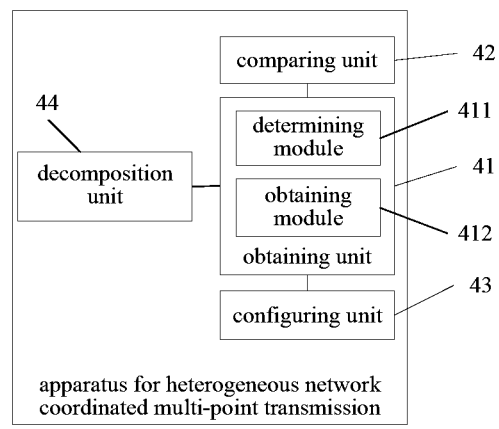
FIG. 5 is a second schematic diagram of a structure of a precoding apparatus for heterogeneous network coordinated multi-point transmission provided by an embodiment of the present invention.

Specifically, as shown in FIG. 5, the obtaining unit 41 is further configured to:

obtain the first channel space transmitting power and the second channel space transmitting power according to the parameter information obtained by the obtaining unit 41.

Further, as shown in FIG. 5, the apparatus further includes:

a decomposition unit 44, configured to perform space decomposition on the heterogeneous network coordinated multi-point transmission system to decompose the same into a channel space and a channel zero space.

Specifically, as shown in FIG. 5, the obtaining unit 41 is specifically configured to:

obtain the transmitting power of various precoding vectors in the channel space according to the user data rate requirements of the user terminals and;

obtain the first channel space transmitting power and the second channel space transmitting power according to the transmitting power of the various precoding vectors.

Specifically, as shown in FIG. 5, the obtaining unit 41 includes:

a determining module 411 configured to, when the comparison result is that the first channel space transmitting power is smaller than or equal to the maximum transmitting power of the macro base station, and the second channel space transmitting power is smaller than or equal to the maximum transmitting power of the micro base station, determine the coordinated multi-point transmission as channel space transmission;

the determining module 411 is further configured to take the first channel space transmitting power as the transmitting power of the macro base station and take the second channel space transmitting power as the transmitting power of the micro base station; and an obtaining module 412, configured to obtain the first precoding vector according to the transmitting power of the macro base station and the transmitting power of the micro base station.

Specifically, as shown in FIG. 5, the obtaining unit 41 includes:

a determining module 411 configured to, when the comparison result is that the first channel space transmitting power is larger than the maximum transmitting power of the macro base station, or the second channel space transmitting power is larger than the maximum transmitting power of the micro base station, determine the coordinated multi-point transmission as joint transmission of the channel space and the channel zero space;

an obtaining module 412, configured to obtain a precoding vector of the channel space and a precoding vector of the channel zero space;

the obtaining module 412 is further configured to obtain the first precoding vector according to the precoding vector of the channel space and the precoding vector of the channel zero space.

Further, as shown in FIG. 5, the obtaining unit is further configured to:

obtain the transmitting power of the macro base station and the transmitting power of the micro base station according to the first precoding vector.

It should be noted that, for the specific embodiments of the precoding apparatus for heterogeneous network coordinated multi-point transmission provided by the embodiment of the present invention, please refer to the specific embodiments of the precoding method for heterogeneous network coordinated multi-point transmission in FIG. 3A and FIG. 3B, and they will not be repeated redundantly herein.

The precoding apparatus for heterogeneous network coordinated multi-point transmission provided by an embodiment of the present invention obtains parameter information of the heterogeneous network coordinated multi-point transmission system; compares a first channel space transmitting power with the maximum transmitting power of a macro base station, and compares a second channel space transmitting power with the maximum transmitting power of a micro base station according to the parameter information to obtain a comparison result; determines an obtaining manner of a precoding vector according to the comparison result, and obtains a first precoding vector according to the obtaining manner of the precoding vector; and configures the macro base station and the micro base station according to the first precoding vector. The main factor considered in the process of obtaining the pre-encoding vector in the prior art is how to achieve an optimal spectrum efficiency. The precoding manner of the heterogeneous network coordinated multi-point transmission in the embodiments of the present invention relates to the maximum transmitting power of the macro base station and the micro base station, such that the energy efficiency of the base stations configured by the obtained precoding vector is higher and the energy necessary for the base stations to transmit unit data is lower, and the purposes of high efficiency and energy saving is achieved.

By means of the above-mentioned descriptions of the embodiments, those skilled in the art to which the present invention pertains may clearly understand that the embodiments of the present invention may be implemented by software plus necessary universal hardware, and may also be implemented by hardware, but under most conditions, the former is a better embodiment. Based on this understanding, the technical solutions in the present invention essentially or the part contributing to the prior art may be embodied in the form of a software product, the computer software product may be stored in a readable storage medium, such as a floppy disk of a computer, a hard disk or an optical disk or the like, and includes several instructions for instructing a computer device (may be a personal computer, a server, or a network device and the like) to perform the methods in the embodiments of the present invention.

The foregoing descriptions are merely specific embodiments of the present invention, rather than limiting the protection scope of the present invention. Any skilled one who is familiar with this art could readily think of variations or substitutions within the disclosed technical scope of the present invention, and these variations or substitutions shall fall within the protection scope of the present invention.

What is claimed is:

1. A precoding method for heterogeneous network coordinated multi-point transmission, applied to a heterogeneous network coordinated multi-point transmission system, the heterogeneous network coordinated multi-point transmission system comprises a macro base station, a micro base station and one or more user terminals, wherein the method comprises:
    obtaining parameter information of the heterogeneous network coordinated multi-point transmission system;
    comparing a first channel space transmitting power with a maximum transmitting power of the macro base station;
    comparing a second channel space transmitting power with a maximum transmitting power of the micro base station according to the parameter information to obtain a comparison result;
    determining an obtaining manner of a precoding vector according to the comparison result;
    obtaining a first precoding vector according to the obtaining manner of the precoding vector; and
    configuring the macro base station and the micro base station according to the first precoding vector.

2. The precoding method for heterogeneous network coordinated multi-point transmission of claim 1, wherein the parameter information comprises a first channel coefficient of the macro base station and the user terminals, a second channel coefficient of the micro base station and the user terminals, a system bandwidth, noise power, user data rate requirements of the user terminals, a number of the user terminals, a number of transmitting antennas of the macro base station, a number of transmitting antennas of the micro base station, the maximum transmitting power of the macro base station, and the maximum transmitting power of the micro base station.

3. The precoding method for heterogeneous network coordinated multi-point transmission of claim 2, wherein before the comparing a first channel space transmitting power with the maximum transmitting power of the macro base station, and comparing a second channel space transmitting power with the maximum transmitting power of the micro base station according to the parameter information to obtain a comparison result, the method comprises:
    obtaining the first channel space transmitting power and the second channel space transmitting power according to the parameter information.

4. The precoding method for heterogeneous network coordinated multi-point transmission of claim 3, wherein before the comparing the first channel space transmitting power with the maximum transmitting power of the macro base station, and comparing the second channel space transmitting power with the maximum transmitting power of the micro base station according to the parameter information to obtain a comparison result, the method comprises:
    performing space decomposition on the heterogeneous network coordinated multi-point transmission system to decompose the heterogenous network coordinated multi-point transmission system into a channel space and a channel zero space.

5. The precoding method for heterogeneous network coordinated multi-point transmission of claim 4, wherein the obtaining the first channel space transmitting power and the second channel space transmitting power according to the parameter information comprises:
    obtaining transmitting power of various precoding vectors in the channel space according to the user data rate requirements of the user terminals; and
    obtaining the first channel space transmitting power and the second channel space transmitting power according to the transmitting power of the various precoding vectors.

6. The precoding method for heterogeneous network coordinated multi-point transmission of claim 5, wherein the determining an obtaining manner of a precoding vector according to the comparison result and the obtaining the precoding vector according to the obtaining manner of the precoding vector, comprises:
    when the comparison result is that the first channel space transmitting power is smaller than or equal to the maximum transmitting power of the macro base station, and the second channel space transmitting power is smaller than or equal to the maximum transmitting power of the micro base station:
    determining the coordinated multi-point transmission as channel space transmission;
    taking the first channel space transmitting power as transmitting power of the macro base station, and taking the second channel space transmitting power as transmitting power of the micro base station; and
    obtaining the first precoding vector.

7. The precoding method for heterogeneous network coordinated multi-point transmission of claim 5, wherein the determining an obtaining manner of a precoding vector according to the comparison result and the obtaining the precoding vector according to the obtaining manner of the precoding vector, comprises:
    when the comparison result is at least one of:
        the first channel space transmitting power is larger than the maximum transmitting power of the macro base station, and
        the second channel space transmitting power is larger than the maximum transmitting power of the micro base station, determining the coordinated multi-point transmission as joint transmission of the channel space and the channel zero space;
    obtaining a precoding vector of the channel space and a precoding vector of the channel zero space; and
    obtaining the first precoding vector according to the precoding vector of the channel space and the precoding vector of the channel zero space.

8. The precoding method for heterogeneous network coordinated multi-point transmission of claim 7, wherein, after the obtaining the first precoding vector according to the precoding vector of the channel space and the precoding vector of the channel zero space, the method further comprises:
    obtaining transmitting power of the macro base station and transmitting power of the micro base station according to the first precoding vector.

9. A precoding apparatus for heterogeneous network coordinated multi-point transmission, applied to a heterogeneous network coordinated multi-point transmission system comprising a macro base station, a micro base station and one or more user terminals, comprising a processor and a non-transitory computer-readable storage medium including computer-executable instructions executed by the processor to perform operations comprising:
    obtaining parameter information of the heterogeneous network coordinated multi-point transmission system;
    a first channel space transmitting power with the maximum transmitting power of the macro base station;

comparing a second channel space transmitting power with the maximum transmitting power of the micro base station according to the parameter information obtained by the obtaining unit to obtain a comparison result;

determining an obtaining manner of a precoding vector according to the comparison result;

obtaining a first precoding vector according to the obtaining manner of the precoding vector; and configuring the macro base station and the micro base station according to the obtained first precoding vector.

10. The precoding apparatus for heterogeneous network coordinated multi-point transmission of claim 9, wherein the parameter information comprises a first channel coefficient of the macro base station and the user terminals, a second channel coefficient of the micro base station and the user terminals, a system bandwidth, noise power, user data rate requirements of the user terminals, a number of the user terminals, a number of transmitting antennas of the macro base station, a number of transmitting antennas of the micro base station, the maximum transmitting power of the macro base station, and the maximum transmitting power of the micro base station.

11. The precoding apparatus for heterogeneous network coordinated multi-point transmission of claim 10, wherein the operations further comprise:

obtaining the first channel space transmitting power and the second channel space transmitting power according to the obtained parameter information.

12. The precoding apparatus for heterogeneous network coordinated multi-point transmission of claim 11, wherein the operations further comprise:

performing space decomposition on the heterogeneous network coordinated multi-point transmission system to decompose the heterogeneous network coordinated multi-point transmission system into a channel space and a channel zero space.

13. The precoding apparatus for heterogeneous network coordinated multi-point transmission of claim 12, wherein the obtaining the first channel space transmitting power and the second channel space transmitting power according to the obtained parameter information comprises:

obtaining transmitting power of various precoding vectors in the channel space according to the user data rate requirements of the user terminals; and obtaining the first channel space transmitting power and the second channel space transmitting power according to the transmitting power of the various precoding vectors.

14. The precoding apparatus for heterogeneous network coordinated multi-point transmission of claim 13, wherein the determining an obtaining manner of a precoding vector according to the comparison result and the obtaining a first precoding vector according to the obtaining manner of the precoding vector comprises:

when the comparison result is that the first channel space transmitting power is smaller than or equal to the maximum transmitting power of the macro base station, and the second channel space transmitting power is smaller than or equal to the maximum transmitting power of the micro base station:

determining the coordinated multi-point transmission as channel space transmission;

taking the first channel space transmitting power as transmitting power of the macro base station;

taking the second channel space transmitting power as transmitting power of the micro base station; and obtaining the first precoding vector.

15. The precoding apparatus for heterogeneous network coordinated multi-point transmission of claim 13, wherein the determining an obtaining manner of a precoding vector according to the comparison result and the obtaining a first precoding vector according to the obtaining manner of the precoding vector comprises:

when the comparison result is that at least one of:
the first channel space transmitting power is larger than the maximum transmitting power of the macro base station, and
the second channel space transmitting power is larger than the maximum transmitting power of the micro base station;

determining the coordinated multi-point transmission as joint transmission of the channel space and the channel zero space;

obtaining a precoding vector of the channel space and a precoding vector of the channel zero space; and obtaining the first precoding vector according to the precoding vector of the channel space and the precoding vector of the channel zero space.

16. The precoding apparatus for heterogeneous network coordinated multi-point transmission of claim 15, wherein the operations further comprise:

obtaining transmitting power of the macro base station and transmitting power of the micro base station according to the first precoding vector.

* * * * *

UNITED STATES PATENT AND TRADEMARK OFFICE
CERTIFICATE OF CORRECTION

PATENT NO. : 9,807,702 B2
APPLICATION NO. : 14/939938
DATED : October 31, 2017
INVENTOR(S) : Liu et al.

Page 1 of 1

It is certified that error appears in the above-identified patent and that said Letters Patent is hereby corrected as shown below:

In the Claims

Column 18, Line 66, "a first channel space" should read -- comparing a first channel space --.

Signed and Sealed this
Twentieth Day of March, 2018

Andrei Iancu
*Director of the United States Patent and Trademark Office*